United States Patent [19]
Crocker et al.

[11] Patent Number: 5,561,747
[45] Date of Patent: Oct. 1, 1996

[54] BOUNDARY EVALUATION IN NON-MANIFOLD ENVIRONMENT

[75] Inventors: Gary A. Crocker, San Diego; Kevin Weiler, Santa Clara; William Reinke, Sausalito, all of Calif.

[73] Assignee: Computervision Corporation, Bedford, Mass.

[21] Appl. No.: 351,871

[22] Filed: Dec. 8, 1994

Related U.S. Application Data

[63] Continuation of Ser. No. 829,934, Feb. 3, 1992, abandoned.
[51] Int. Cl.$^6$ ................................................ G06T 17/10
[52] U.S. Cl. ........................ 395/119; 395/141; 395/120
[58] Field of Search ........................ 395/119–121, 134, 395/135, 141

[56] References Cited

U.S. PATENT DOCUMENTS

| | | | |
|---|---|---|---|
| 4,208,719 | 6/1980 | Lotz et al. | 395/143 |
| 4,757,461 | 7/1988 | Stöhr et al. | 395/120 |
| 4,785,399 | 11/1988 | Evans et al. | 395/156 |
| 4,809,201 | 2/1989 | Keklak | 395/135 |
| 4,956,787 | 9/1990 | Ito et al. | 395/120 |
| 5,027,292 | 6/1991 | Rosignac et al. | 395/122 |
| 5,179,644 | 1/1993 | Chiyokura et al. | 395/141 |
| 5,278,983 | 1/1994 | Kawabe et al. | 395/120 |

OTHER PUBLICATIONS

Weiler, K., *Polygon Comparison using a Graph Representation*, ACM, 1980.
Weiler, K. *Boundary Graph Operators for Non–Manifold Geometric Modeling Topology Representations*, Geometric Modeling for CAD Applications, Wozny et al., eds., Elsevier Science Publishers, 1988.
Weiler, K. *The Radial Edge Structure: A Toppological Representation for Non–Manifold Geometric Boundary Modeling*, Geometric Modeling for CAD Applications, Wozny et al., eds., Elsevier, 1988.

Crocker, G., *Boundary Evaluation of Solids Models: Algorithm Study and Implementation*, Master's Thesis, RPI, Dec. 1988.

*Primary Examiner*—Heather R. Herndon
*Assistant Examiner*—Anton W. Fetting
*Attorney, Agent, or Firm*—Wolf, Greenfield & Sacks, P.C.

[57] ABSTRACT

An information processing system performs boundary evaluation in a non-manifold environment. The system may be used for representation of objects in three dimensions, in a very general manner. Objects are represented by merging boundary representations of constituent sub objects, and selecting portions of the resulting merge boundary representation. Selection is based on criteria applied to a containment history of each portion of the merged boundary representation.

A data structure suitable for boundary evaluation in a non-manifold environment includes a constructive solid geometry tree and a boundary representation. The boundary representation further includes boundary descriptions, a list of regions, containment histories of each region and a mark indicative of selection or non-selection of each region.

12 Claims, 17 Drawing Sheets

TO UNMERGE A SUB-OBJECT FROM A MERGED SET:
FOR EACH FACE IN THE MERGED SET DO:
    {IF THE CONTAINMENT HISTORY OF THE REGION ON
    ONE SIDE OF THE FACE DIFFERS FROM THE
    CONTAINMENT HISTORY ON THE OTHER SIDE OF THE
    FACE *ONLY BY* THE SUB-OBJECT TO BE REMOVED,
    THEN DELETE THE FACE;};
FOR EACH EDGE IN THE MERGED SET DO:
    {IF THE EDGE HAS NO ADJACENT FACES, THEN DELETE
    THE EDGE; IF THE EDGE HAS TWO ADJACENT FACES
    LYING ON A SINGLE SURFACE, THEN DELETE THE EDGE;
    IF THE EDGE HAS ONE ADJACENT FACE, THEN DELETE
    THE EDGE;};
FOR EACH VERTEX IN THE MERGED SET DO:
    {IF THE VERTEX HAS NO ADJACENT EDGES AND NO
    ADJACENT FACES, THEN DELETE THE VERTEX;
    IF THE VERTEX HAS NO ADJACENT EDGES AND ONE
    ADJACENT FACE, THEN DELETE THE VERTEX;
    IF THE VERTEX HAS TWO ADJACENT EDGES AND
    TWO ADJACENT FACES, THEN DELETE THE VERTEX;};
FOR EACH REGION IN THE MERGED SET DO:
    {REMOVE THE SUB-OBJECT FROM THE CONTAINMENT
    HISTORY OF THE REGION;}.

*Fig. 14*

BOUNDARY EVALUATION IN NON-MANIFOLD ENVIRONMENT

This application is a continuation of application Ser. No. 07/829,934, filed Feb. 3, 1992, abandoned.

BACKGROUND OF THE INVENTION

1. Field of the Invention

The present invention relates generally to information processing systems for representing objects in three dimensions. The present invention relates more specifically to systems which use boundary representations (BREPs) to represent objects in a non-manifold environment.

2. Description of the Prior Art

Modeling of objects in three dimensions using information processing systems has many applications. For example, software models are used during the design of mechanical parts. Testing a model of a part for parameters such as correct fit is usually much less expensive than testing an actual part. Another important purpose of modeling is to obtain a visual image of a part under design. Thus, a number of modeling technologies have been developed and optimized for determining various parameters of a modeled part and for providing visual images of a modeled part.

There are two ways of representing complex information, such as that contained in a solid model, explicitly and implicitly. In an explicit representation, operations called for by the input data are fully resolved. Thus, the representation contains only the final result of those operations called for by the input data. In contrast, in an implicit representation, relationships between the input data are not fully resolved; in fact, they may not be resolved at all. Thus, an implicit representation contains representations of both data and operations to be performed on them.

One approach to solid modeling, known as Constructive Solid Geometry (CSG), creates an implicit representation of a complex solid, as a collection of primitive solids and operations for combining them. This representation of a complex solid in CSG is implicit, because the operations by which the primitive solids are combined to form a complex solid are not resolved. Thus, for example, if a hole "drilled" through a cube is desired, the resulting CSG model (as illustrated in FIG. 1a) contains information about both the entire volume of the cube 101 and the cylinder 103 used to "drill" the hole (i.e., the volume where the cylinder 103 coincides with the cube 101 is subtracted), as well as the operation performed (volumetric subtraction, in this case). Extraneous information, such as a specification of those portions of the cylinder 103 which may extend beyond the boundaries of the cube 101 are also retained in a database holding the model.

Complex objects are formed by performing Boolean operations on two or more primitive solids. These operations include, but are not limited to volumetric union, volumetric intersection and volumetric subtraction. By applying Boolean operations to an aggregation of primitive solids, a variety of complex solid objects may be represented. For example, subtracting a cylinder from a cube produces a cube having a hole drilled in it like that of FIG. 1a. The Boolean operations which may be performed on primitive solids represent the range of operations used while designing a part.

In CSG, a complex solid is typically represented as a tree data structure. The data stored in the tree data structure includes a set of primitives and a set of Boolean operations which are performed on the primitives. A simple example of such a tree data structure is illustrated in FIG. 1b, for the solid shown in FIG. 1a. The CSG tree data structure for this solid model comprises data storage nodes of two types, interior nodes 105 and leaf nodes 107a and 107b. The leaf nodes 107a and 107b represent primitive solids 101 and 103. The interior node 105 specifies a Boolean operation 109 to be performed, in this case a Boolean subtraction, and includes data pointing 111a and 111b to leaf nodes 107a and 107b upon which the Boolean operation 109 is performed.

Since a CSG model does not include an explicit representation of the complex solid being modeled, the data structure is evaluated for display when a visual image is requested. This is difficult and time-consuming. Furthermore, matters are made worse since the evaluation is performed each time a change is made to the data structure.

A second approach to solid modeling, Boundary Representation (BREP), creates an explicit representation of a complex solid in the form of geometric shape information and topological information. The geometric shape information includes information such as volumes, surfaces, curves and points. The topological information corresponds to the respective geometric information. Hence, information such as a specification of regions, faces, edges and vertices is included in the topological information. Two additional topological entities, loops and shells, are used in representations of holes in faces and voids in regions, respectively.

In a boundary representation, the data structure used to hold a complex solid model is a connected graph of the topological entities of the complex solid model. Thus, useful adjacency relationships may be derived from the graph of the topology data structure, or those relationships may be explicitly stored within the data structure.

A drawback of the boundary representation approach of the prior art is that modification of a model stored as an explicit representation of a desired solid is difficult. Making even minor changes to a model frequently involves performing a boundary evaluation of a complete CSG representation of the model. Boundary evaluation is a process of creating or maintaining a boundary representation equivalent of a CSG representation of an object. A further drawback of the prior art stems from the reliance on manifold structures in the prior art, as explained below.

In the context of solid modeling, the term manifold is commonly used as an abbreviation of the term two-manifold, meaning "locally two-dimensional." That is, on the boundary of a manifold solid, for example as shown in FIG. 2a, the small area around any point 201 is "locally two-dimensional," or homomorphic to a disk (i.e., there is a 1—1 mapping of the points of a small region of a manifold solid to the points of the disk). Thus, the small area around any point, such as the area in section IIb, has a direct correspondence with the disk and may be squashed flat, as illustrated in FIG. 2b, without leaving any protruding features and without requiring the laying of one feature on top of another. This is contrasted with the same test applied to section IIIb of FIG. 3a showing a non-manifold (i.e., not two-manifold) topology. Wire 301 protruding from point 303 cannot be squashed flat without overlaying some of the surrounding surface 305, as shown in FIG. 3b. Thus, wire 301 does not have a direct correspondence with any part of the disk not already occupied by the surrounding surface 305. Solid modelers of the prior art store adjacency data of boundary representations as manifold topological representations or only permit a limited subset of non-manifold conditions to be stored as special cases.

However, modeling solids in a manifold environment is inadequate, since simple operations on manifold objects may produce non-manifold objects. Mathematically speaking, the set of Boolean operations is not closed over the set of manifold solids. For example, performing the union of two boxes oriented in space to share a common edge produces an object which is non-manifold at any point along the shared edge. Thus, another problem in the prior art is that manifold-based solid modelers either give up some adjacency data wherever a non-manifold condition occurs, or treat the non-manifold condition as a special case, or else simply fail to perform the required operation. Since many important constructions are non-manifold, the inability to handle non-manifold conditions is an important deficiency of manifold modelers of the prior art.

Therefore, it is an object of the present invention to provide a method and apparatus for performing boundary evaluation of boundary representation models having non-manifold topologies.

Another object of the present invention is to provide a method and apparatus that performs boundary evaluation of non-manifold boundary representation models without resorting to special cases to represent the information inherent in non-manifold topologies.

Another object of the present invention is to provide a general method and apparatus that performs local modification of an explicit boundary representation reflecting modifications to a corresponding implicit CSG representation without resorting to a complete rederivation of the boundary representation from the CSG representation.

SUMMARY OF THE INVENTION

In order to achieve the above and other objects, an information processing system for representing an object composed of one or more primitive objects in a three-dimensional coordinate system is provided. The object is represented as a boundary representation. Boundary representations include boundaries which divide the space in which the coordinate system is defined into regions on each side of a surface, boundaries which define edges of surfaces and boundaries which define the ends of edges. Each region of a solid has a history associated therewith, the histories designating within which primitive each region is contained. Also, those independent topological entities other than regions not forming the boundary of an entity, have histories associated therewith.

The information processing system includes means for constructing a merged boundary representation from the boundary representations of the primitives comprising the object. The merged boundary representation includes merged boundaries defining merged regions and independent entities, each having associated histories. Also included is means for selecting merged regions and independent entities on the basis of the history information for the merged regions and independent entities.

The selection may be performed on the basis of specified Boolean operations received by the system. Merged regions and independent entities so selected may then be displayed, or further processed.

A method for performing boundary evaluation which achieves the above and other objects may be simply expressed as four steps performed on boundary representations of sub-objects provided for processing.

1. intersecting—finding intersections between entities of each sub-object;

2. constructing—constructing a merged boundary representation including all entities of the sub-objects provided, as well as the intersections "created" by the step of intersecting;

3. classifying—determining containment, or whether regions of space are "inside" or "outside" of geometric entities of the sub-objects provided and geometric entities resulting from the step of intersecting, relative to each primitive; and 4. selecting—using results of the step of classifying to solve a desired Boolean operation, and marking those portions forming the solution.

Those portions marked in the step of selecting may then be displayed or used in further processing. Since none of the original data has been discarded, modifications to existing portions of the boundary representation may be readily made, as will be seen in connection with a preferred embodiment.

BRIEF DESCRIPTION OF THE DRAWING

The present invention may be better understood in connection with the accompanying drawing, in which like reference designations denote like elements.

FIG. 1b is a graphical illustration of a tree structure, such as used in a CSG representation of the prior art of the solid model of FIG. 1a.

FIG. 2b is an enlarged view of section IIb of FIG. 2a after squashing the section flat according to a test for manifold geometry, as applied to the geometry of FIG. 2a.

FIG. 3b is an enlargement of section IIIb of FIG. 3a after squashing the section flat according to a test for manifold geometry, as applied to the geometry of FIG. 3a.

FIG. 14 is a simplified flow chart of a method of unmerging primitives according to the present invention.

DETAILED DESCRIPTION

A preferred embodiment of the present invention is now described, with reference to the accompanying drawing.

Figure 4:
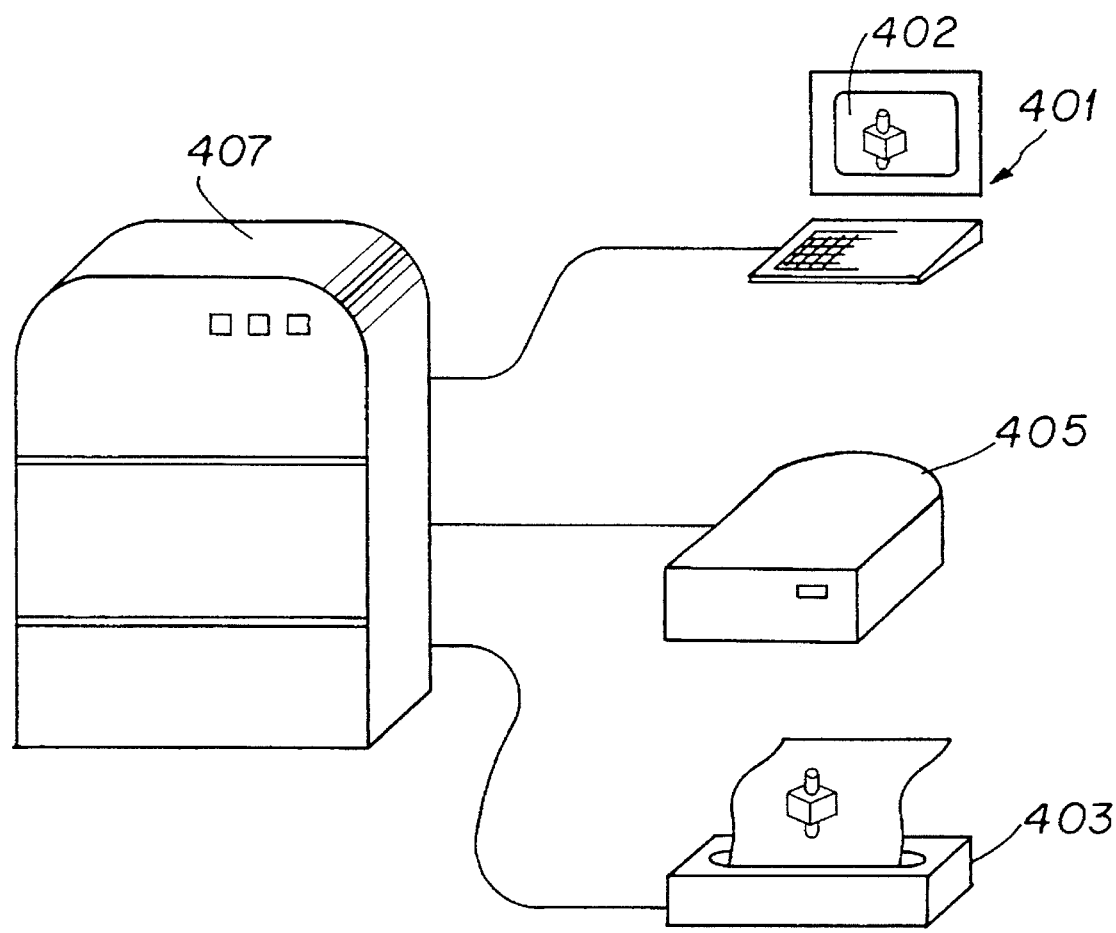
FIG. 4 is a block diagram of an information processing system that may be used in the present invention.
Figure 5:
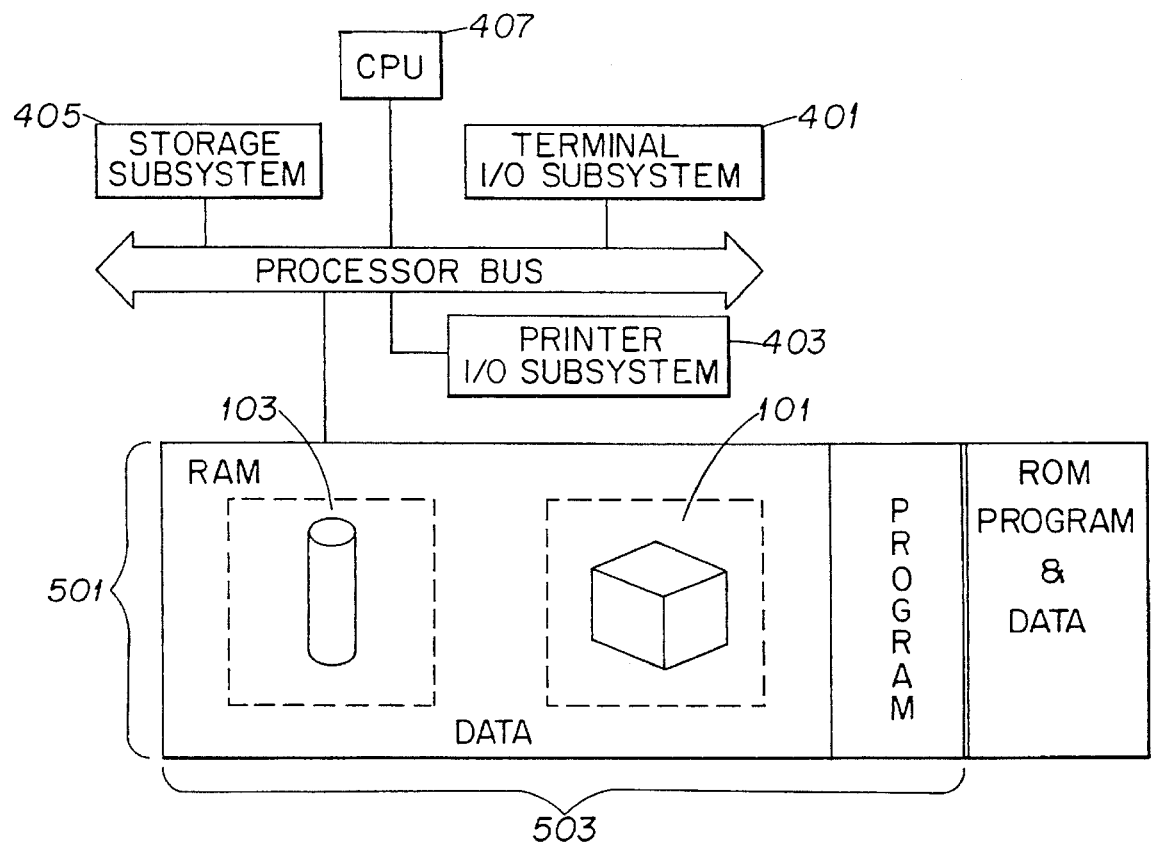
FIG. 5 is a more detailed block diagram of the information processing system of FIG. 4.

In general terms, the preferred embodiment of the present invention relies on a software program executing in a general-purpose information processing system, as illustrated in FIGS. 4 and 5. The information processing system of the preferred embodiment has a terminal 401 connected to a central processing unit (CPU) 407, although other suitable means for receiving input from an operator and displaying output to an operator may be used. The terminal 401 of the preferred embodiment is equipped with a cathode-ray tube (CRT) display 402 for providing both text and image data to the operator. Many suitable CRT display terminals and other suitable video display terminals are known in the art. The information processing system may be optionally provided with other peripheral devices, such as hard copy output devices 403, storage devices 405 and communications devices (not shown), such as may be required for particular purposes. For example, in a CAD/CAM environment, communications devices may be used to communicate finished model information to computer-controlled manufacturing equipment.

As shown in FIG. 5, the information processing system contains a memory 501 for holding software program information and data. Although the memory for holding data in this preferred embodiment is solid-state, random access memory (RAM) 503, other memory and storage technologies known in the art may also be suitable. Data stored in the RAM 503 is structured by a software program or other entity which stores data in an appropriate format for the operations to be performed on the data. A preferred data structure for use in the present invention will be described in detail, below. However, the invention will first be described in more general terms.

A system embodying the present invention is well suited for use by a mechanical designer or the like. A design may be interactively created and modified by use of the terminal 401, for example. During interactive creation of a design, data representing a solid model of the design may be stored in RAM 503, a storage subsystem 405 or partly in each, as might be convenient for efficient operation of the system.

In a preferred embodiment of the present invention, the way in which the designer has chosen to combine primitives is stored as a Boolean logic tree. Parameters which define the actual characteristics of each primitive are initially stored as individual boundary representations. During interactive design activities, boundary evaluation is performed to provide a single, merged boundary representation that correctly reflects the current state of the Boolean logic tree. As described herein below, the merged boundary representation provides a correct representation of a Boolean logic tree, without re-evaluating the entire boundary representation for each change to the Boolean logic representation.

Figure 6A:
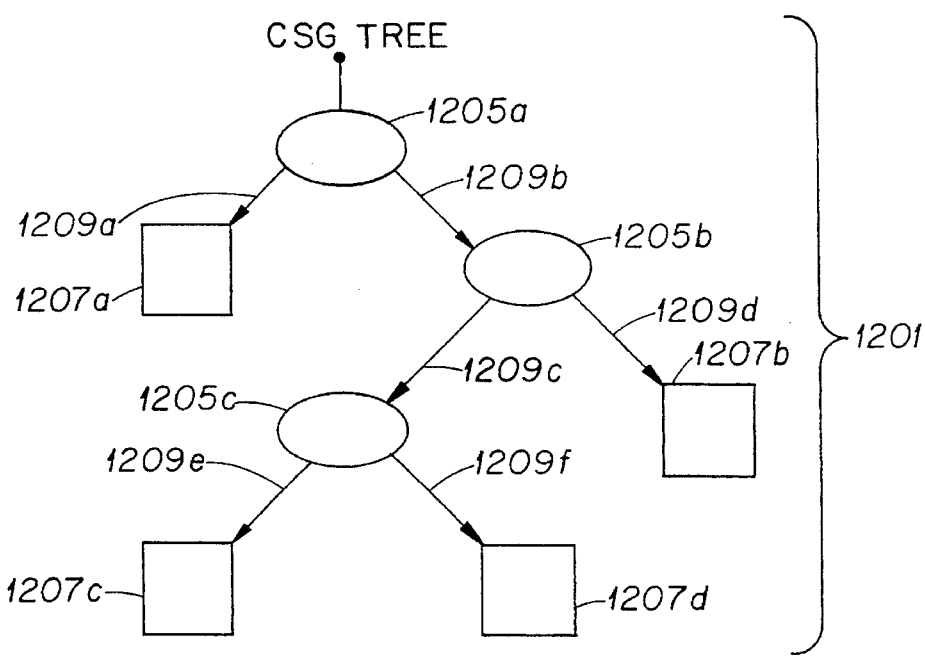
FIGS. 6a and 6b are diagramatic views of the data structure of one embodiment of the present invention.
Figure 6B:
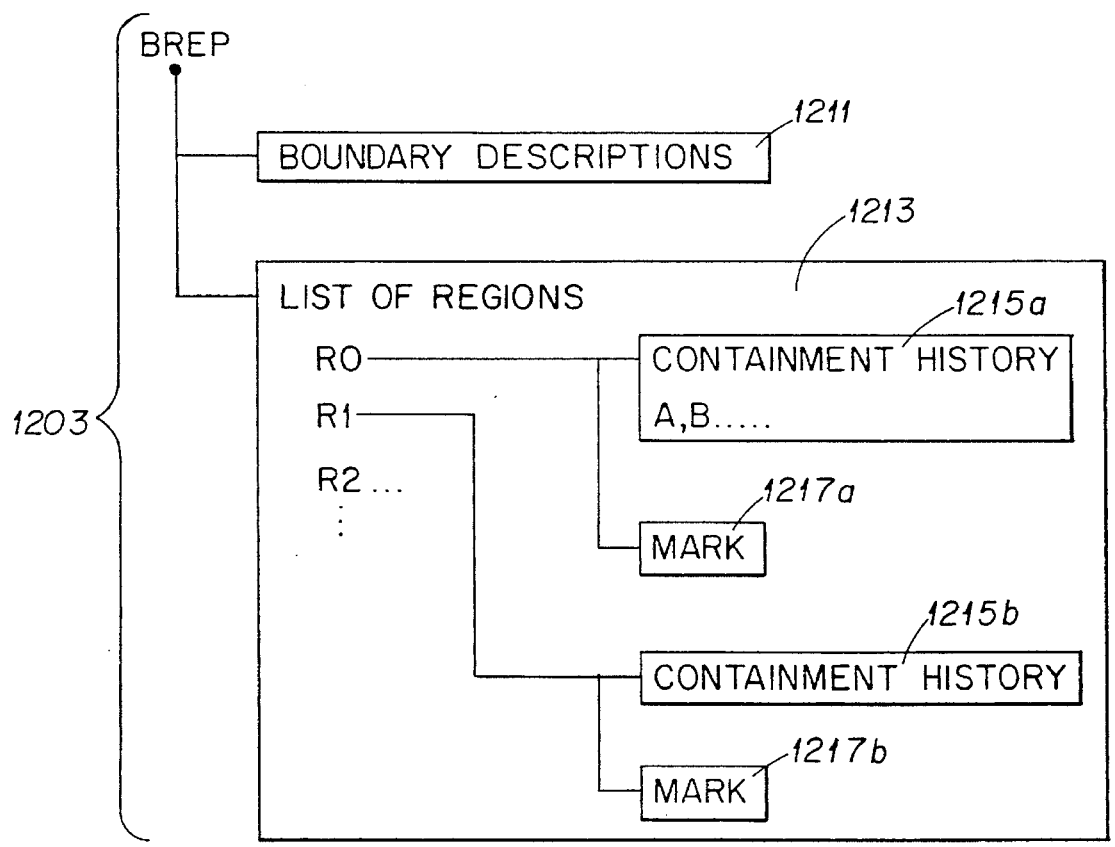

Referring to FIGS. 6a and 6b, the data structure of the present invention is now described. This data structure has two parts, a Boolean logic tree 1201, shown in FIG. 6a, and a BREP 1203, shown in FIG. 6b. A BREP 1203 may represent a simple primitive or may be a merged boundary representation of a complex combination of primitives. The Boolean logic tree 1201 defines what operations are to be performed on the boundary representations that constitute a merged boundary representation. The Boolean logic tree 1201 may be stored as a linked list of pointers and Boolean operators, while the BREP 1203 may be stored as a linked list of records.

The Boolean logic tree portion 1201 of this data structure includes interior nodes 1205(a–c) and leaf nodes 1207(a–d). The leaf nodes 1207 each hold a label identifying a primitive solid which is part of the present model. Each interior node 1205 specifies a Boolean operation to be performed on the primitives identified in one or more leaf nodes 1207 and includes data pointing 1209 to operands upon which the Boolean operation is performed. If an operand of a first interior node 1205a is a second interior node 1205b, then the Boolean operation of the first interior node 1205a is to be performed on the result of evaluating second interior node 1205b. However, since the Boolean logic tree portion of the structure contains only labels identifying the primitives to be operated on, boundary evaluation is performed on the primitives indicated to produce a desired model.

The BREP portion 1203 of the data structure includes boundary descriptions 1211 and a list 1213 of regions and other independent entities defined by the boundary descriptions 1211. For simplicity only regions are referred to here, but other independent topological entities are treated similarly. For each region R0, R1, R2, . . . , the list of regions further includes a containment history 1215(a–b), which is a list of primitives that enclose that region, and a location for storing a mark 1217(a–b), which indicates whether that region has been selected as a result of the operations identified in the Boolean logic tree portion 1201. A merged boundary representation results from boundary evaluation of a Boolean logic tree containing a plurality of primitives and at least one Boolean operation.

Figure 7:
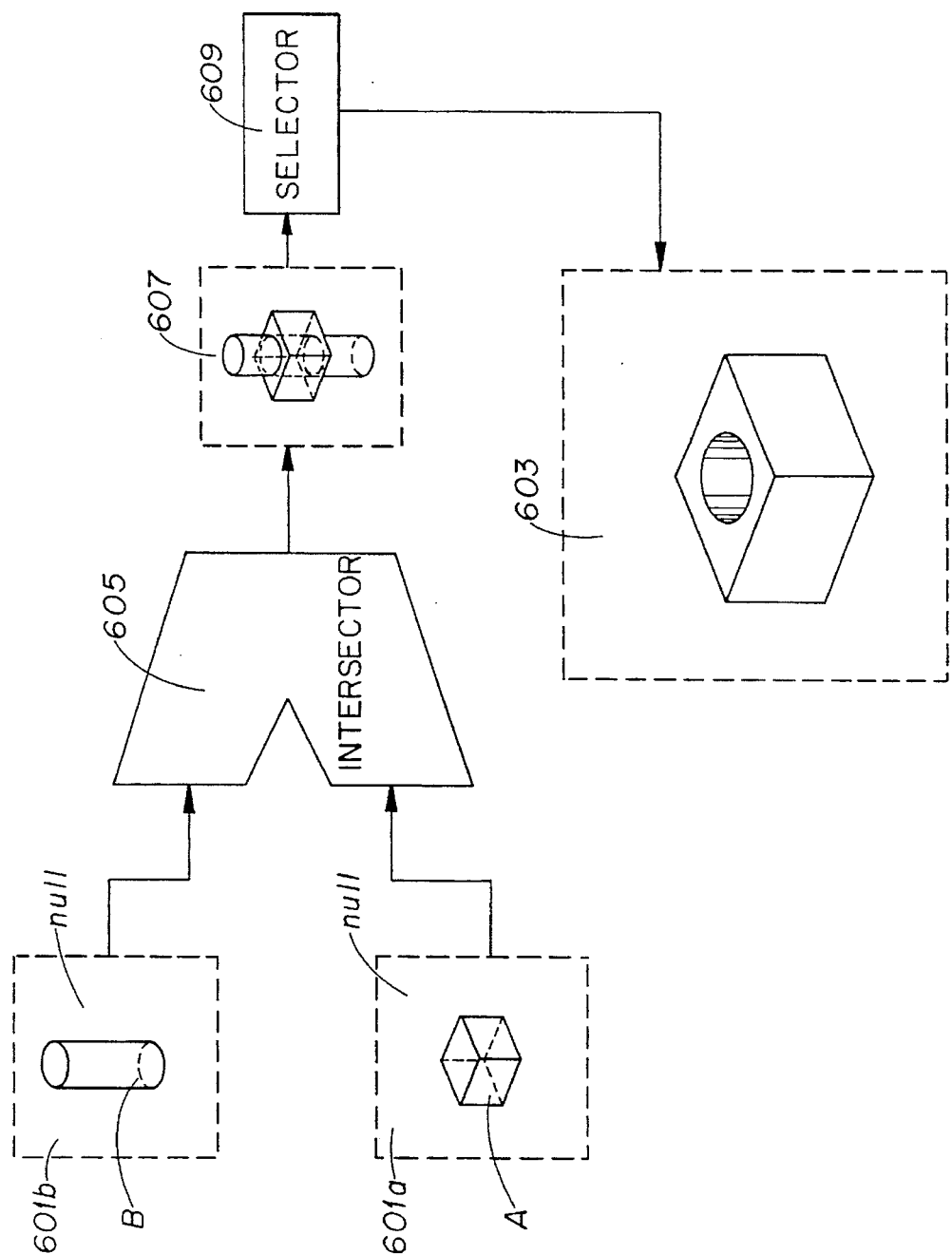
FIG. 7 is a block diagram of a boundary evaluation apparatus according to the present invention.

Referring now to FIG. 7, a simplified block diagram of boundary evaluation according to a preferred embodiment of the present invention is described. Boundary evaluation operates on two or more boundary representations, such as representations 601a and 601b to produce a more complex boundary representation, like 603. The boundary representations operated on 601a and 601b are termed "primitives," regardless of whether they represent simple geometric entities, such as the cube A and the cylinder B in FIG. 7, or more complex boundary representations which have already been built from simple geometric entities. The operations to be performed are those stored in a Boolean logic tree, as described above with reference to FIG. 6. In the present illustration, regions or volumes in space bounded by the boundaries defined in a boundary representation, are classified as inside or outside the primitive.

Boundary representations are combined by a means for intersecting 605 which combines separate boundary representation data structures in RAM 503 into a merged boundary representation. Thus, a merged boundary representation 607 is produced, which contains in one data structure all the information formerly contained in the two separate boundary representations. The merged representation may be produced by creating pointers in RAM 503 that point to the desired data structures or by moving data within RAM 503 to form a single, consolidated data structure. Additionally, the merged boundary representation 607 contains information identifying any new boundaries created by intersections between primitives.

The new boundaries in the merged boundary representation 607 define new regions that are classified according to containment history information regarding the primitives they are inside. New independent entities, having their own containment history information, may also be defined in the merged boundary representation.

In the example, there being no independent entities in the merged boundary representation 607, regions defined in the merged boundary representation are selected 609 for further manipulation or display, for example. As previously described in connection with FIG. 6, selected regions are marked in a part of the data structure for holding mark information 1217(a–b) by a software program executing in the data processing system. In the example illustrated in FIG. 7, the portion of the cube A not contained within the cylinder B has been selected; that is, a volumetric Boolean subtraction of the cylinder from the cube has been performed.

Figure 8:
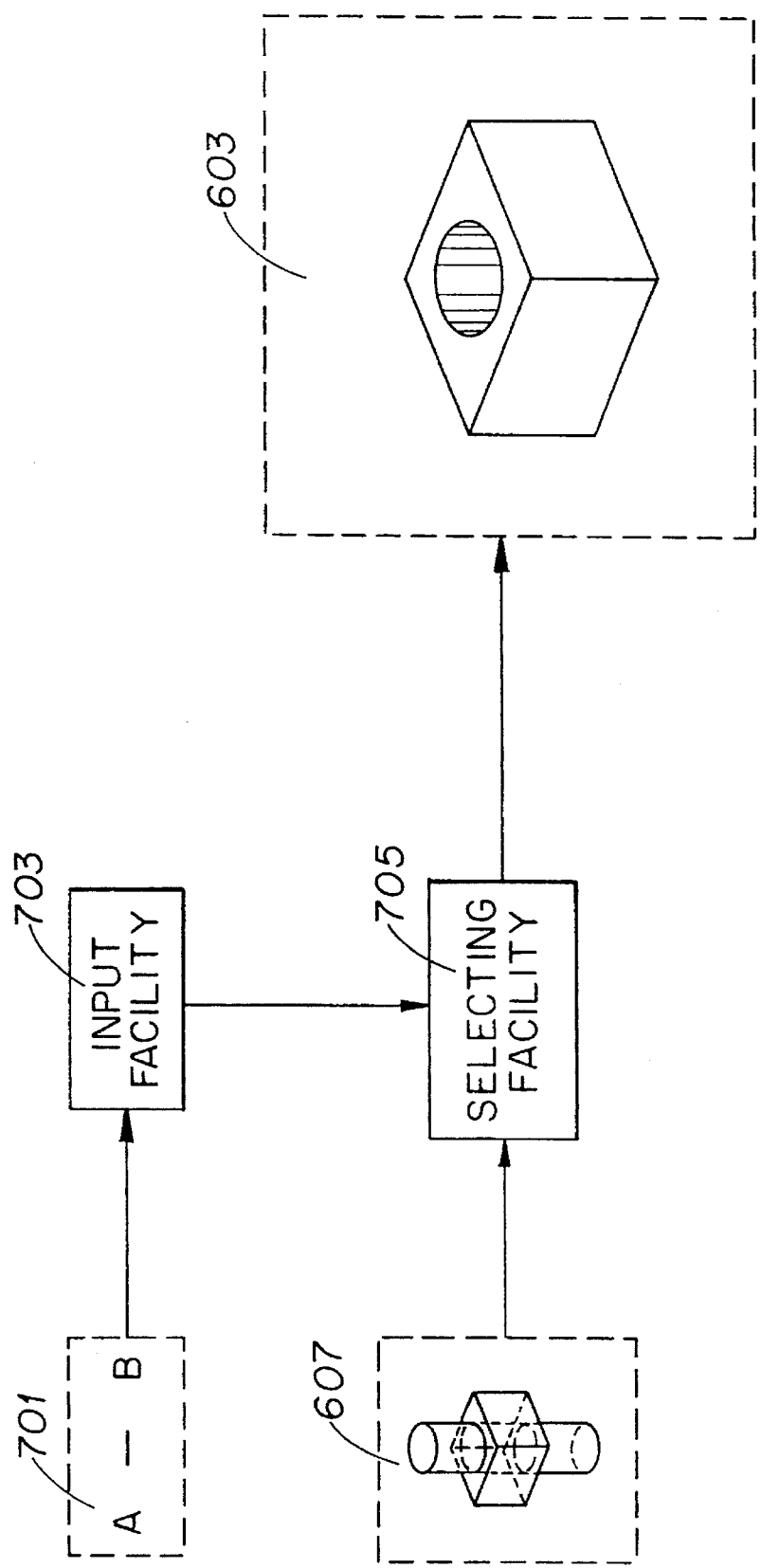
FIG. 8 is a more detailed block diagram of a selecting element shown in FIG. 7.

The selection apparatus is now described in further detail with reference to FIG. 8. A desired Boolean operation 701 on the primitives which were combined to form the merged boundary representation is received by an input facility 703, such as computer terminal 401. This input is stored in appropriate locations of the Boolean logic tree, such as nodes 1205(a–c) as described above with reference to FIG. 6. A selecting facility 705 places a mark in the merged boundary representation 607 also as described above with reference to FIGS. 6 and 7, indicating for each region whether or not that region has been selected. Regions are selected based on comparing their containment history with the desired Boolean operation. Thus, in the example illustrated wherein the desired Boolean operation is A–B, all regions in primitive A but not in primitive B will be marked. The resulting boundary representation 603 is shown in FIG. 8, as it might appear if output for display, for example.

In summary, the embodiment of the present invention described thus far includes a data structure which stores complete information on the primitives and operations which constitute a model, apparatus for combining the information comprising two or more primitives in the data structure and apparatus for selecting portions of the stored information on the basis of the operations. The selected portions may then be displayed, or otherwise operated upon. The data structure, apparatus for combining and apparatus for selecting may be embodied as a combination of general-purpose data processing hardware and software, for example.

Figure 9:
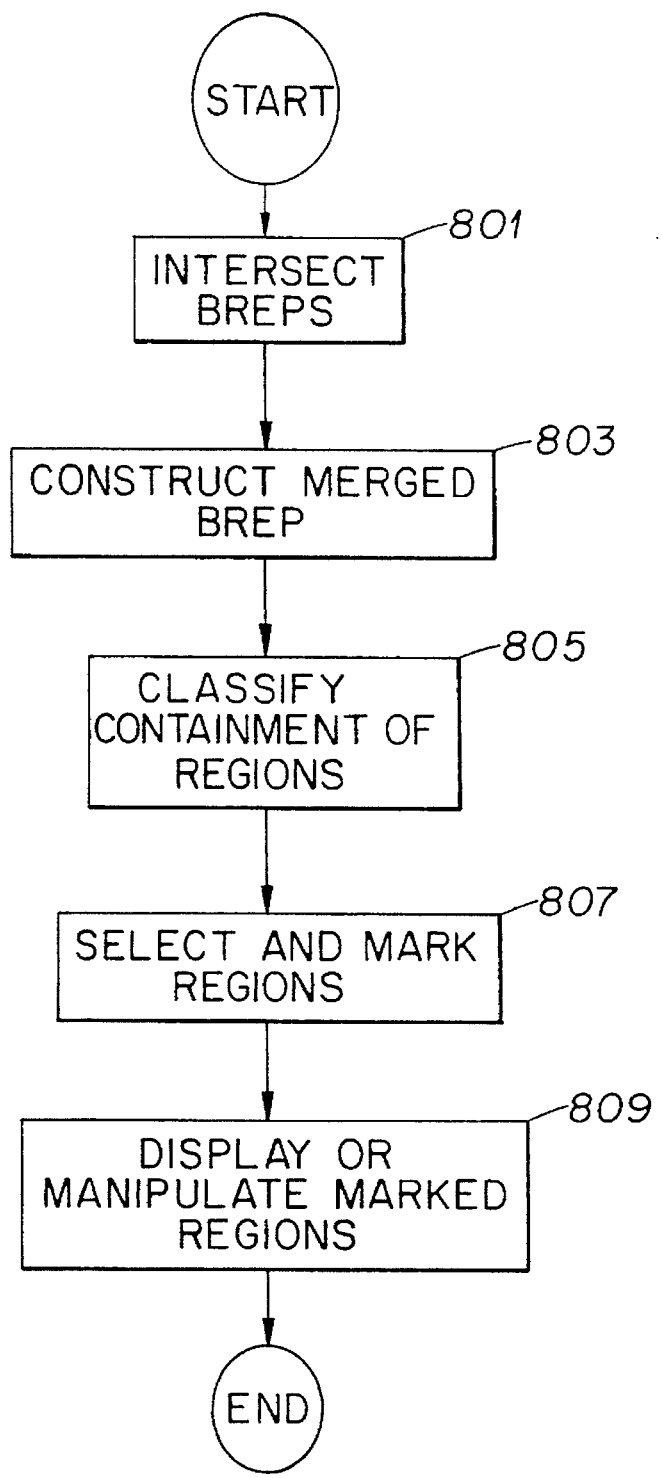
FIG. 9 is a simplified flow chart of a method of boundary evaluation according to the present invention.

The steps of a method in accordance with one embodiment of the present invention, which is practiced on the apparatus described above, are shown in the flow chart of FIG. 9. As may be appreciated by those skilled in the art, the steps of this method may be embodied in software executing in a general-purpose data processing system, special-purpose hardware or a combination of hardware and software, as may be preferred for various particular purposes. Each step of the disclosed method will now be described in further detail, using the same example as described with reference to FIGS. 6–8. The method will be better understood with additional reference to the data structures of FIG. 6. For simplicity, the following description will make reference to regions wherever an entity having its own containment history is being manipulated. When other entities are to be treated specially, they are specifically mentioned.

Figure 1A:
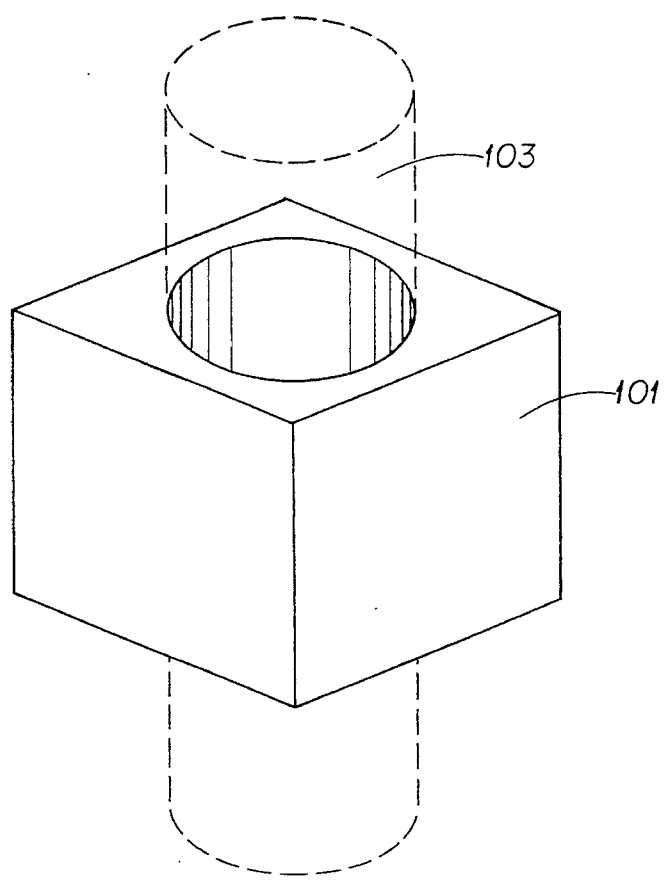
FIG. 1a is a perspective view, illustrating the subtraction of a cylinder primitive from a cube primitive, as performed in the prior art.
Figure 1B:
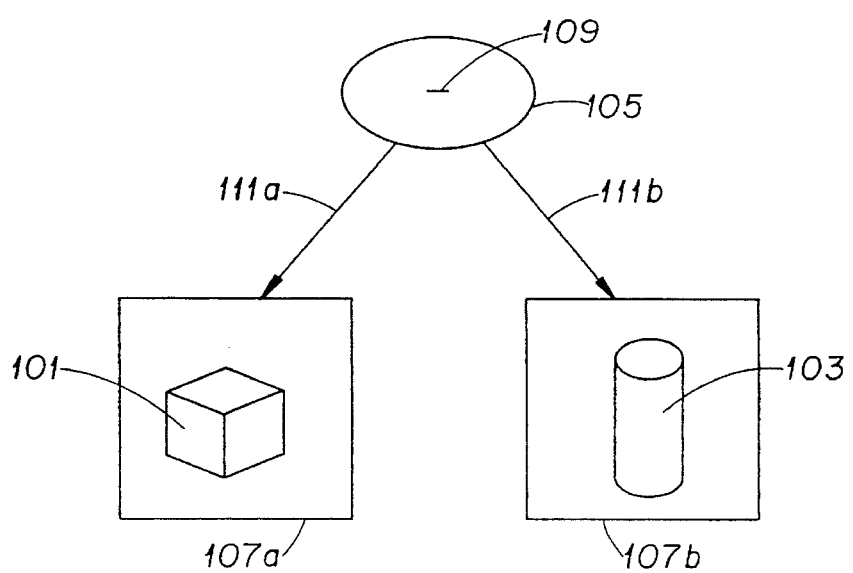
Figure 2A:
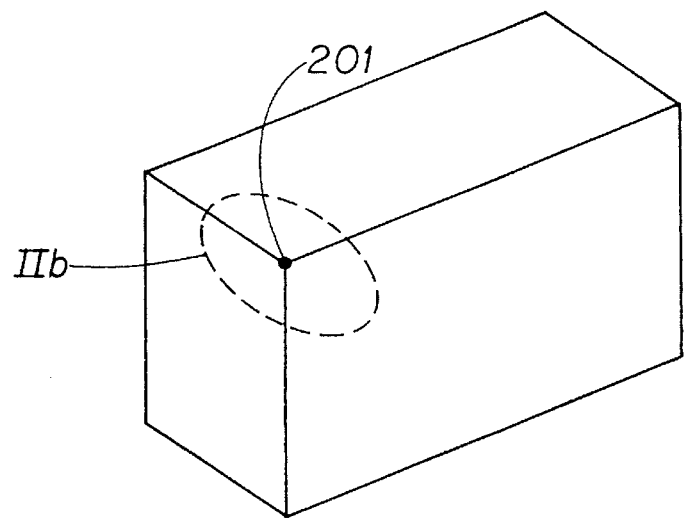
FIG. 2a is a perspective view illustrating a manifold geometric construction.
Figure 2B:
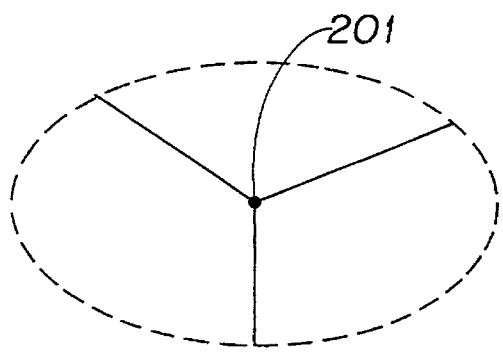
Figure 3A:
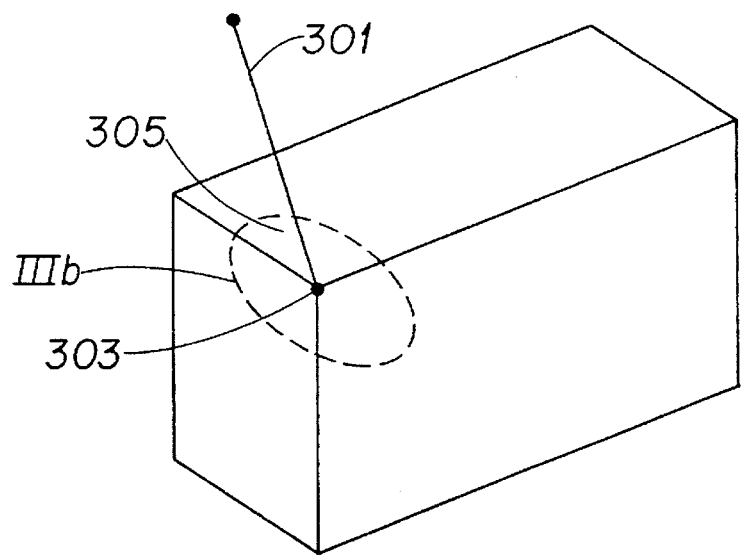
FIG. 3a is a perspective view illustrating a non-manifold geometric construction.
Figure 3B:
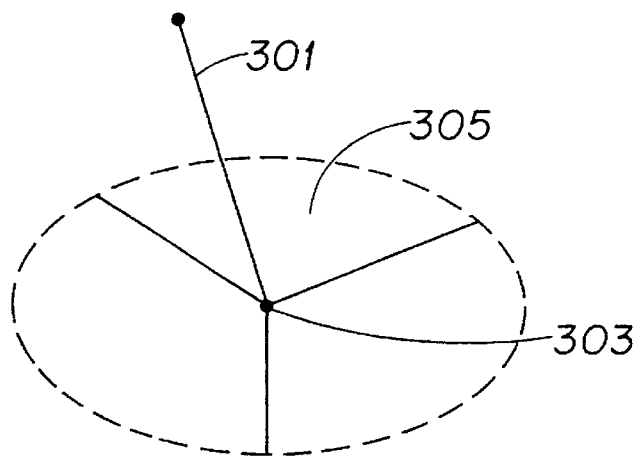

The primitives provided are boundary representations of a cube 601a and a cylinder 601b. These are disposed in space to intersect, as shown in FIG. 1a for example. The region within the cube has containment history A, while the region outside the cube has containment history null. Likewise, the region within the cylinder has containment history B, while the region outside the cylinder has containment history null. These containment histories 1215 are held in locations within the boundary representations 1203 of the primitives, as shown in FIG. 6.

Figure 10:
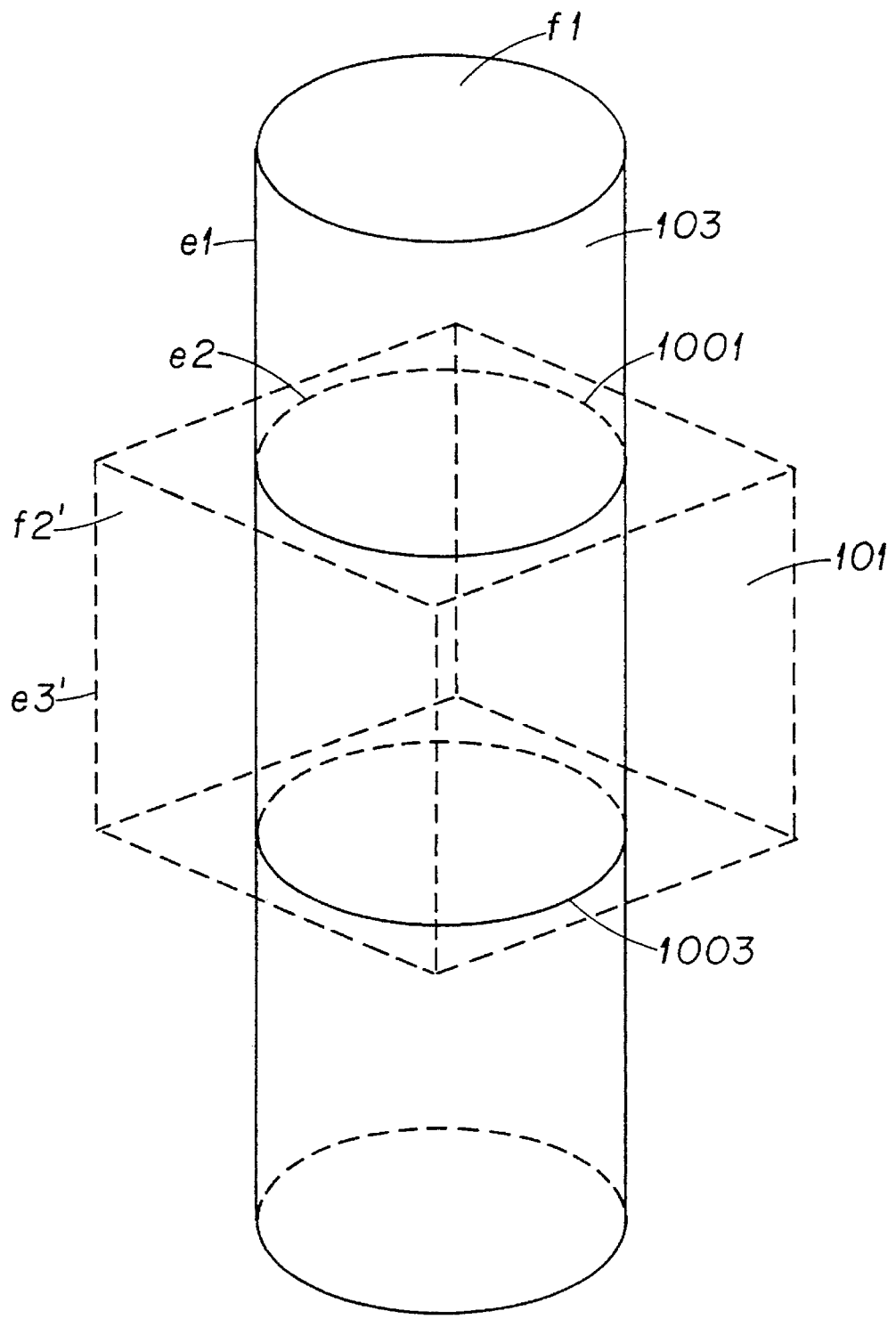
FIG. 10 is a perspective view illustrating the intersection of a cube with a cylinder in the cylinder boundary representation.
Figure 11:
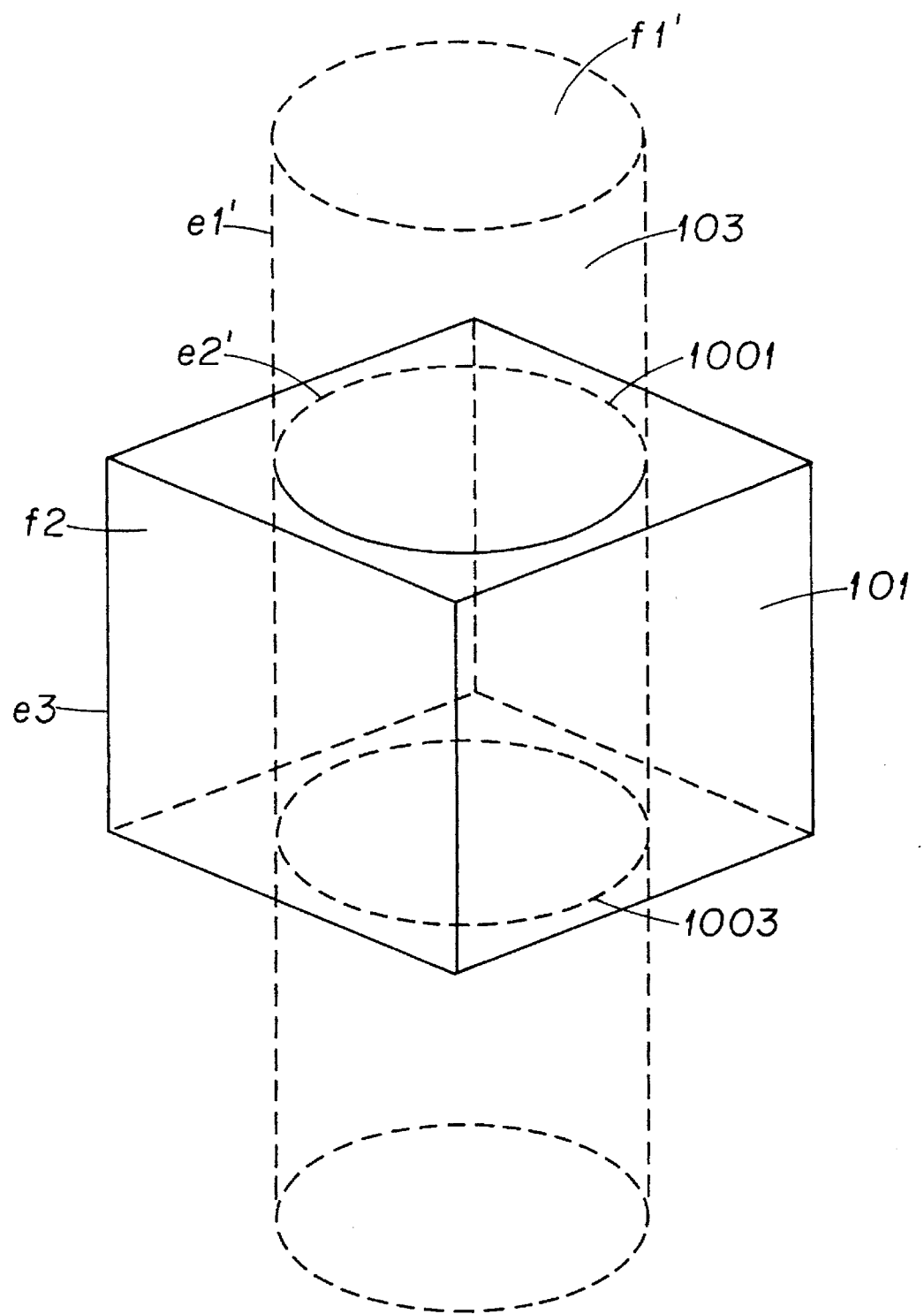
FIG. 11 is a perspective view illustrating the intersection of a cube with a cylinder in the cube boundary representation.

The primitives provided are intersected in step 801, to identify and create all intersections of each in the other. This modifies the boundary description 1211 in the primitives. In general, surface-surface intersections produce curves and points. In the instant example, the intersection between the cylinder 103 and the cube 101 produce circular curves 1001 and 1003 (FIG. 10) where top and bottom surfaces of the cube 101 are cut by a wall of the cylinder 103, as shown in FIGS. 10 and 11. The intersection, curves 1001 and 1003, created in one of the primitives, for example in the cylinder 103 as shown in FIG. 10 will become a foundation of the next step. Notice also that curves 1001 and 1003 divide the top and bottom faces of cube 101 into two faces, each. That is, the top face is divided into a top face outside curve 1001 and a top face inside curve 1001, for example. Curves 1001 and 1003 are added to the boundary descriptions 1211 of the boundary representation 1203 of each primitive.

Included in the above-described step of intersecting is the building of a table of relations in which the correspondence between entities created in each primitive is stored. This table of relations serves two purposes.

First, the table assists in reducing the amount of processing required to evaluate a model. The intersections partition the object into networks of topological entities, each of which have common containment histories. By traversing each of the networks completely, before moving on to the next network, as described in the step of construction, below, processing is reduced, because the containment of all elements of a given network may be determined once, rather than requiring reevaluation each time the given network is entered or exited during the traversal. By relying on the table of relations, a network with elements in both primitives may be completely traversed, as described above, rather than having to traverse all the networks in one primitive before traversing those in the other.

Second, the relations in the table of relations are used later, during face creation and classification. By referring to the table of relations, the step of construction determines where new faces are required, such as when curves 1001 and 1003 divide top and bottom faces of cube 101 into two faces, each.

An example of the relations stored in the table of relations is now described with reference to FIGS. 10 and 11. In FIG. 10, one face of cylinder 103 is identified as face f1. An edge of the cylinder e1 and an edge e2, created by the intersection of cylinder 103 and cube 101, and corresponding to curve 1001 are also shown. In FIG. 11, there is a face f1' and edges e1' and e2'. The table of relations links each edge and face constructed in one boundary representation with the corresponding edge and face constructed in the other boundary representation. Therefore, the table of relations links face f1 with face f1', edge e1 with edge e1' and edge e2 with edge e2'. Likewise, face f2 and edge e3 of cube 101 in FIG. 11 are linked to face f2' and edge e3' in FIG. 10. These links or relations are created and stored for all topological entities comprising the primitives.

Figure 12:
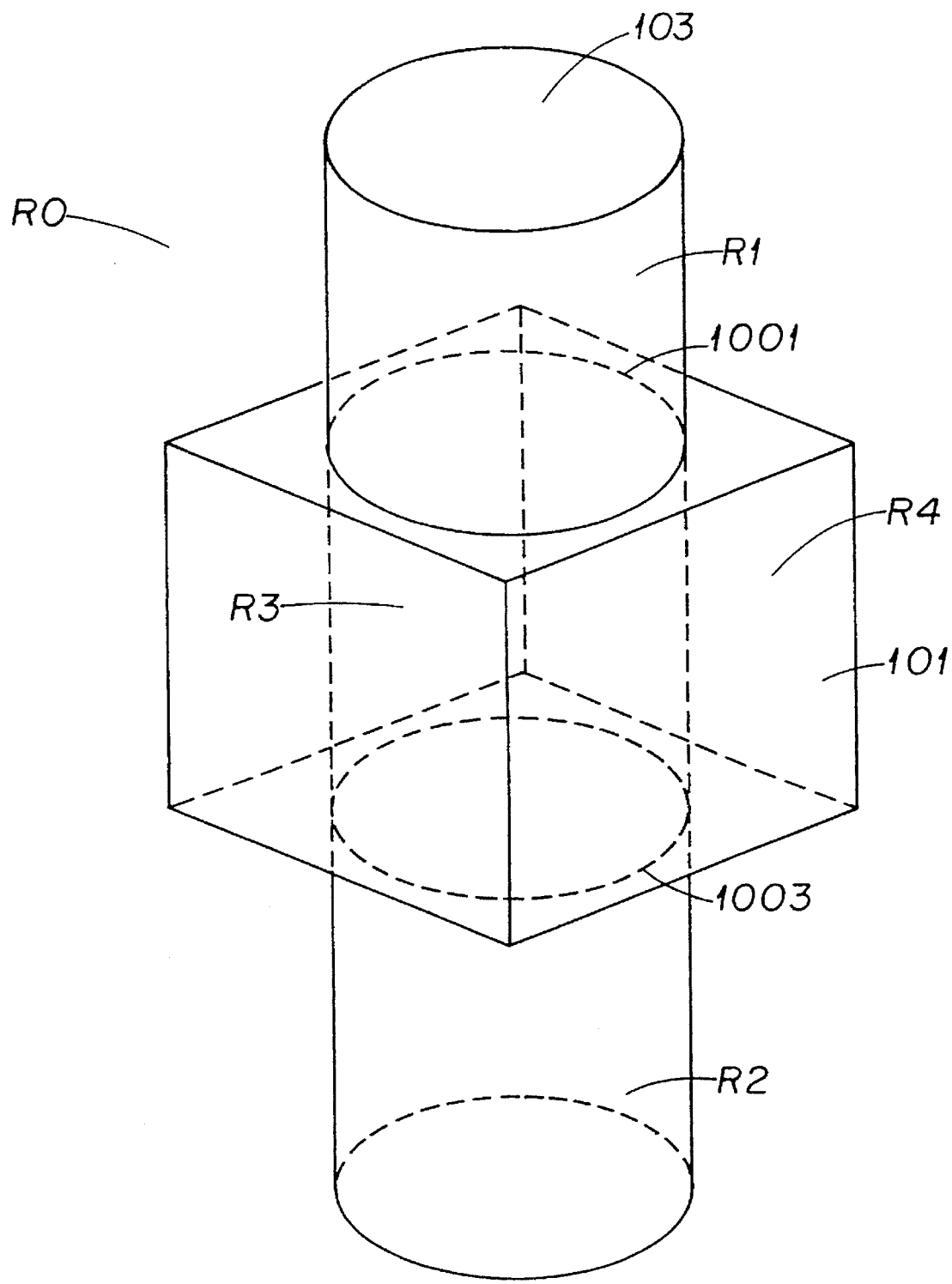
FIG. 12 is a perspective view illustrating a merged boundary representation, showing the regions defined by the intersected cube and cylinder primitives.

A merged boundary representation is now constructed in step 803, by constructing one primitive in the other. In this example, the cube 101 is constructed in the cylinder 103. First wire edges of the cube primitive are constructed in the cylinder primitive database. Then, faces of the cube primitive are constructed in the cylinder primitive boundary representation. These constructions constitute further modifications to the boundary descriptions 1211 of the cylinder primitive boundary representation. As seen in FIG. 12, adding intersections and boundaries from the cube primitive to the cylinder primitive boundary representation has split space into additional regions. Although the original cylinder primitive boundary representation included only a region within the cylinder and a region outside the cylinder, the merged boundary representation includes five regions, identified as R0, R1, R2, R3 and R4. The cylinder primitive boundary representation has been transformed into a merged boundary representation containing merged data from the cylinder primitive, the cube primitive and the intersection of the primitives.

Regions of the merged boundary representation are now classified in step 805 according to the primitives which contain them. This classification (step 805) of a region updates the containment history 1215 of the region within the data structure.

Prior to classification (step 805), the regions have containment histories 1215 related only to the cylinder 103, since the boundary representation defining that primitive formed the foundation for the merged boundary representation. Thus, the containment histories 1215 of the regions are according to the following table before classification (step 805).

TABLE 1

| |
|---|
| R0 - null |
| R1 - B |
| R2 - B |
| R3 - B |
| R4 - null |

All the faces of the cube 101 are now traversed, including those additional faces created by the steps of intersecting 801 and constructing 803. That is, a list is formed of all faces of the cube 101 and the additional faces created by the step of intersecting 801 such that adjacent faces in the list are adjacent in the topology of the model. The construction of this list is facilitated, as noted above, by the table of relations, which has assisted in maintaining the adjacency of new faces created by intersection. Containment histories 1215 from the cube primitive, as obtained for the regions on both sides of each face from the list, in turn, are transferred into the merged boundary representation. If any inner regions, not bounded by any face of the primitive traversed have been created in the merged boundary representation, containment history information would be propagated into those regions after traversal is complete. Thus, in the instant example, the containment histories 1215 of the regions in the merged boundary representation are as in the following updated table after classification.

TABLE 2

| |
|---|
| R0 - null |
| R1 - B |
| R2 - B |
| R3 - A, B |
| R4 - A |

Once the regions are classified in step 805 by their containment histories 1215, a desired Boolean operation may be applied.

Selecting regions in step 807 for display or to become the subject of future manipulation in step 809 gives as a result a marked database containing a boundary representation of the desired construction. In the present example, the desired Boolean operation 701 is A–B. This is equivalent to requesting all regions of space occupied by the cube primitive 101, except those regions also occupied by the cylinder primitive 103, to be marked. Faces, edges and vertices may also be marked by this operation, as will be explained below.

The containment history 1215 of each region determines whether the region should be selected. This determination is made by comparing the containment history 1215 of each region with the desired Boolean operation 701. The desired Boolean operation 701 to be performed between any two primitives is found by examining a post-fix storing representation of the CSG tree. The post-fix string representation is produced by performing a post-fix traversal of the CSG tree to collect logical representations of the primitives and the Boolean operations.

Selected regions, that is those which form part of the result of the desired Boolean operation 701, are then marked in the location provided 1217 in the merged boundary representation. In the instant example, regions including A in their containment history 1215, but not including B in their containment history 1215 are selected. Once selection has been determined for all regions, faces are selected.

Face selection depends first on the regions bounded by that face. If a face bounds exactly one selected region, then it, too, is selected. Otherwise, the face is selected if it has its own containment history, matching the desired Boolean operation. After selected faces have been marked, edges are selected and marked.

Edge selection and then vertex selection proceed in a manner similar to that of face selection, but wherein edges bound faces and vertices bound edges. An edge not having its own containment history is selected if it bounds any selected face, and a vertex not having its own history is selected if it bounds any selected edge. Edges and vertices having their own histories are selected in a manner similar to regions.

The merged boundary representation, thus marked, may then be further manipulated or displayed (step 809). If the merged boundary representation is to be displayed (step 809), then all marked entities are made visible for display on a terminal device 401 or on a hard copy output device 403, in step 809.

Changes to an existing merged boundary representation are easy to make in a system according to the present invention. For example, changing one Boolean operation, anywhere in the model, simply involves re-marking regions in the merged boundary representation data structure according to the new criterion. A method of re-marking begins with unmarking in the locations provided 1217 in the merged boundary representations all those entities satisfying the original Boolean operation. Entities which satisfy the new Boolean operation to be performed are then marked, as described above. Although containment histories of all entities are examined, both parts of this method affect only those entities whose containment histories satisfy either the original Boolean operation or the new Boolean operation. A complete re-evaluation of the model, as would be the case in the prior art, is unnecessary, therefore the time expended in prior art systems for reevaluating entities not affected by the change is saved.

In the cube-and-cylinder example used above, the original Boolean operation of A–B may be changed to A & B, for example. In this example, only the regions are treated, although the method applies to all entities having their own containment history. The containment history of each region (or entity, in general) is examined. With reference to the regions of Table 2, R4 had satisfied the original Boolean operation. Therefore, it had been marked. Now, it is unmarked, because it satisfies the original Boolean operation. Next, R3 would be marked, because it satisfies the new Boolean operation. As may be seen in this example, unaffected regions R0, R1 and R2 are not reevaluated, only their containment histories have been compared with the original Boolean operation and the new Boolean operation. There is no need to perform again the intersecting, constructing and classifying steps, because the results of those operations is what is currently held in the data structure.

Figure 13A:
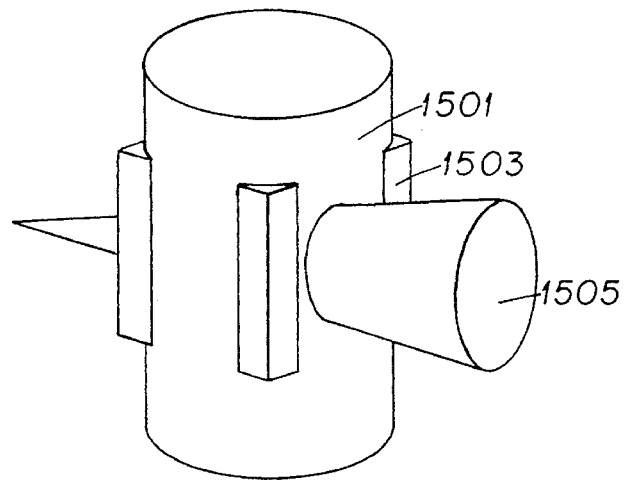
FIGS. 13A through 13C are perspective views illustrating editing of a merged boundary representation including intersected cube, cylinder and cone primitives.
Figure 13B:
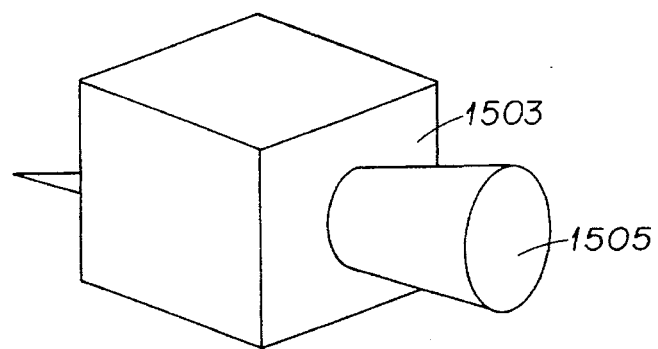
Figure 13C:
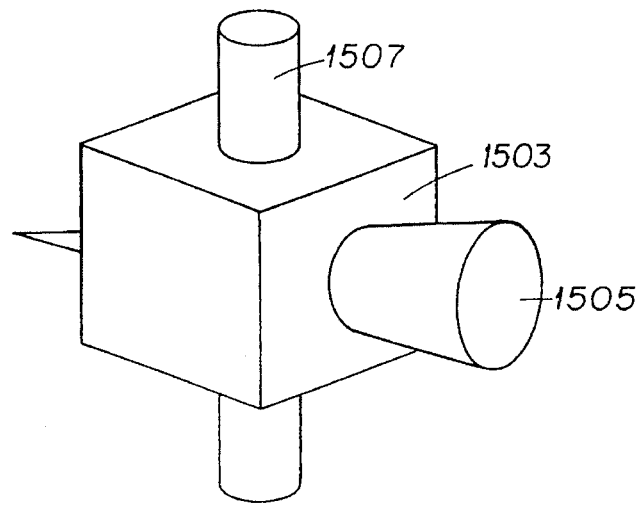

By using the present invention, it is also easy to make changes to or edit an existing merged boundary representation by modifying or removing one or more of the original primitives. There is no loss of performance in making modifications to primitives introduced at any period in the development of a particular model. For example, as illustrated in FIGS. 13A–C, an operator may change the radius of cylinder 1501 without disturbing cube 1503 or cone 1505 by simply unmerging cylinder 1501 as described below and reintroducing a new cylinder 1507 having a different radius. When the merge set comprises many individual primitive solids, the present invention shows a marked improvement in performance over the prior art, because the entire CSG tree need not be reevaluated. Instead, only the affected elements need be reevaluated. The savings realized here are similar to those described above, in connection with modifying a Boolean operation, because entities are not completely reevaluated; instead containment histories are merely examined to determine whether an entity is affected by a change. Again, the steps of intersecting, constructing and classifying the elements of the non-affected primitives need not be performed again, because the data structure already holds the results of those steps.

The steps of a method in accordance with one embodiment of the present invention, for unmerging a primitive from a merged set and suitable for editing a merged boundary representation as described above are now described in connection with FIGS. 14 and 15. As is apparent from the preceeding, many changes to a merged set begin by unmerging one or more primitives from the merged set.

The disclosed method of unmerging begins with the step of removing the faces of the primitive being unmerged, and then proceeds with the steps of removing edges and removing vertices of the primitive being unmerged. Finally, a step of removing regions associated with the primitive being unmerged is performed.

For each face, for example f3 and f4 in the merged set an absolute face containment history difference is examined 1301. That is, if the containment history of a region on one side of the face differs from the containment history of a region on the other side of the face only by the containment history of the primitive being removed, then that face is associated with the primitive being removed, such as f4. Therefore, that face (f4) would then be deleted 1303. Removing all of the faces associated with the primitive being removed leaves the edges, vertices and regions of the primitive being removed.

Next, each edge in the merged set undergoes a series of tests to determine whether that edge should be removed. Each edge, such as e4, having no adjacent faces 1305 is deleted 1307. Each remaining edge, such as e5, having one or more adjacent faces, is tested to determine if it has two adjacent faces, each lying on the same surface 1309. If so, then that edge e5 is deleted 1311. Finally, each remaining edge, such as e6 is tested to determine if it has only one adjacent face 1313. If it does, then it (e6) is deleted. At this point, all edges not associated with the non-removed portion of the merged set have been deleted.

Vertices are processed according to similar rules. If a vertex, such as v1, is adjacent to no edges and no faces 1317, then it (v1) is deleted 1319. If a vertex, such as v2, which has not yet been deleted is adjacent to no edges but is adjacent to one face 1321, then it (v2) is deleted 1323. Finally, the remaining vertices, such as v3, that are adjacent to both two edges on the same surface and two faces 1325 are deleted. Now, all that remains of the primitive being removed is a reference to it in containment histories of regions it once occupied (not visible in FIGS. 15A–H).

The final step in unmerging a primitive from a merged set is to remove from the containment history of each region any reference to that primitive.

FIGS. 15A–15H are now briefly described in illustration of the foregoing method.

Figure 15A:
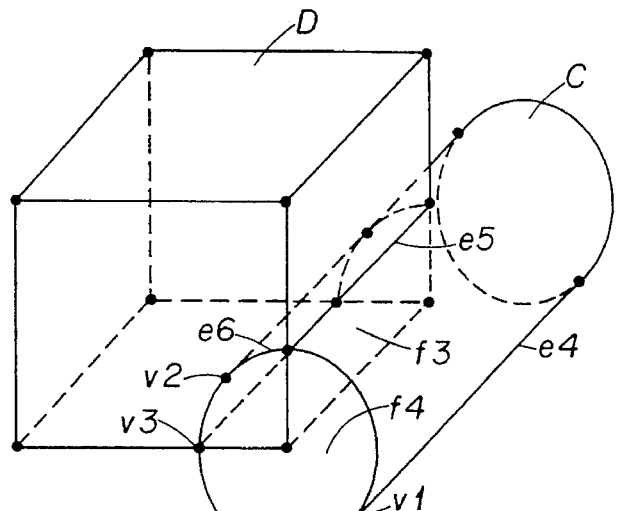
FIG. 15A through 15H are perspective views illustrating the method of unmerging one primitive from a merged set.
Figure 15B:
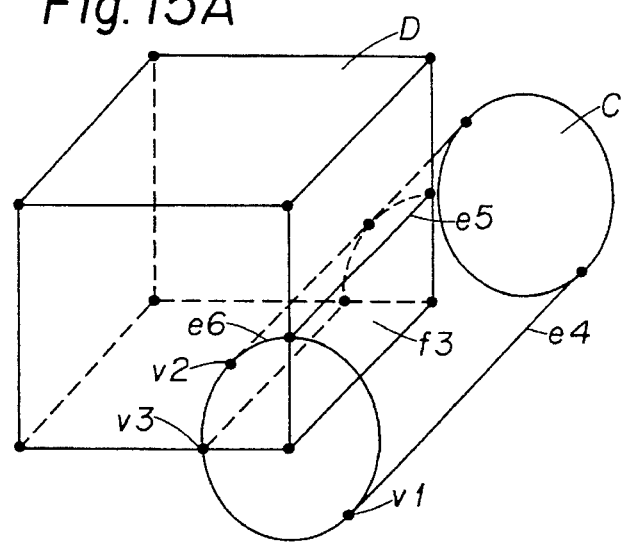
Figure 15C:
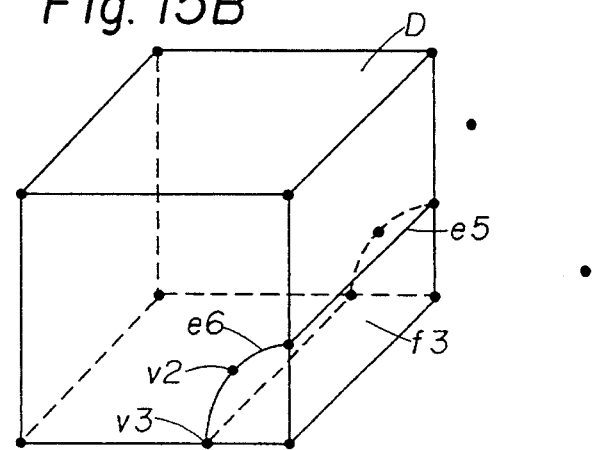
Figure 15D:
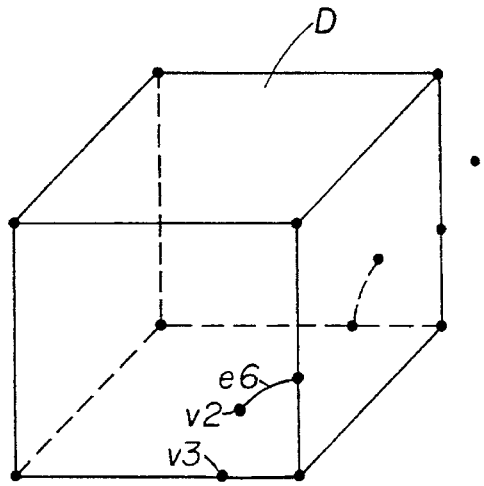
Figure 15E:
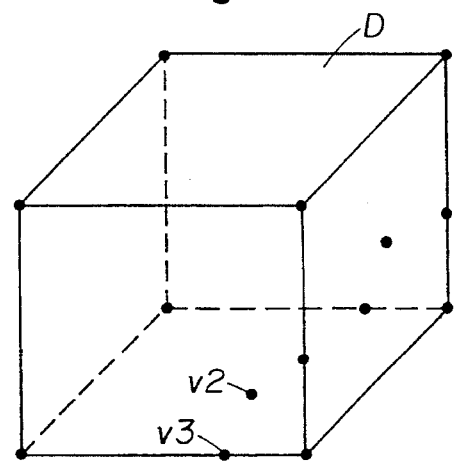
Figure 15F:
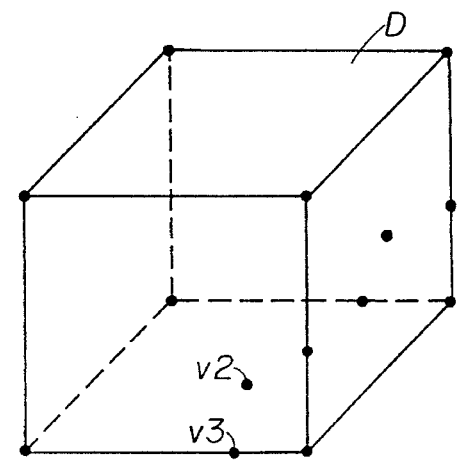
Figure 15G:
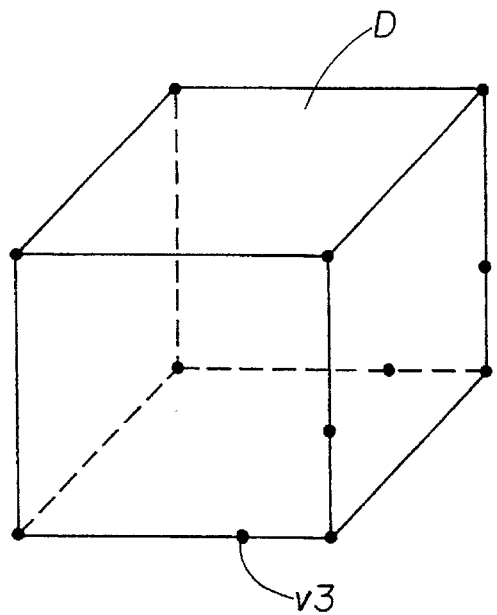
Figure 15H:
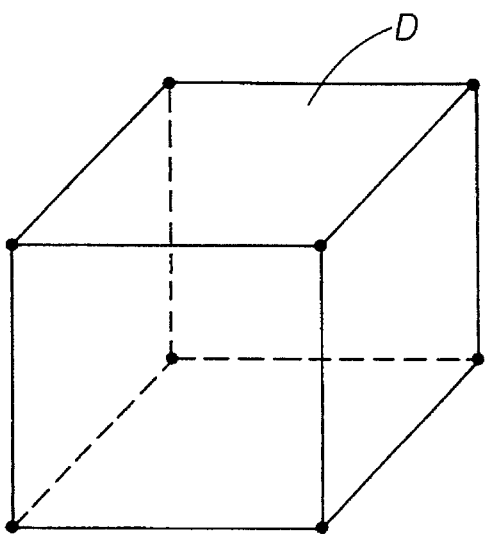

In FIG. 15A, a merged set consisting of a cylinder C and a cube D is illustrated. The cylinder C will be unmerged from the cube D. As seen in FIG. 15B, all faces, such as f4, associated only with cylinder C have been removed. Next, FIG. 15C shows the result of deleting all edges adjacent to no faces (eg. e5). Next edges adjacent to two faces lying on the same surface (eg. e5) are deleted, resulting in the condition shown in FIG. 15D. Deletion of edges is completed in FIG. 15E, with the deletion of edges having only one adjacent face (eg. e6). In FIG. 15F, vertices having no adjacent edges and no adjacent faces are deleted (eg. v1). Next, vertices having no adjacent edges and one adjacent face (eg. v2) are deleted, resulting in the condition of FIG. 15G. Finally, FIG. 15H shows the result of deleting vertices having two adjacent edges lying on the same curve and also two adjacent faces (eg. v3). In this illustration, updating the containment histories of the regions results in no visible change, therefore FIG. 15H illustrates the final result.

The present invention has been described in connection with a preferred embodiment. However, this embodiment is given by way of example only. Various modifications and extensions which will now be apparent to those skilled in the art are contemplated as falling within the scope of the present invention as defined by the appended claims.

What is claimed is:

1. An information processing system for representing in a memory in the system a non-manifold object in a three-dimensional coordinate space as a plurality of boundary representations (BREPs), the BREPs including boundaries dividing the coordinate space into a plurality of topological entities each topological entity having a containment history list structure associated therewith, each containment history consisting of a list of identifiers of original BREPs containing the topological entity, absent an identification of operations performed therebetween, and further representing the object as a constructive solid geometry (CSG) tree defining boolean operations to be performed between the original BREPs, the system comprising:

a. means for merging said plurality of original BREPs to form a merged BREP having merged boundaries and for storing said merged BREP including all said boundaries of said plurality of original BREPs in the memory, and said means for merging including
    means for forming merged boundaries defining merged topological entities at intersections between said plurality of original BREPS,
    means for forming a list consisting of a union of the containment history list data structures of said plurality of topological entities of said plurality of BREPs from which are formed each merged topological entity, the list formed absent an identification of operations performed between topological entities, and means for storing into locations of the memory associated with each merged topological entity the list containing the containment history of each merged topological entity;

b. means for comparing a result of a boolean expression combining original BREPs with the containment histories to determine whether each topological entity is within a combination of original BREPs represented by the boolean expression; and c. means for in locations of the memory associated with each topological entity marking for further processing those entities within the combination of original BREPs from among said merged topological entities, the marked entities forming a set of topological entities corresponding to said object represented, and the means for marking responsive to said means for merging.

2. An information processing system as claimed in claim 1, further comprising:

a. means for unmerging said merged BREP by removing a constituent BREP therefrom.

3. An information processing system as claimed in claim 1, wherein said means for marking further comprises:

a. means for receiving a representation of a Boolean operation to be performed using said plurality of BREPs as operands; and b. means for writing marks in locations in the memory corresponding to said merged regions representing a result of said Boolean operation received.

4. An information processing system as claimed in claim 1, further comprising:

means responsive to said means for marking for displaying images of said marked entities.

5. In a data processing system, a method for displaying a graphical image of an object including a plurality of sub-objects represented in a memory by boundary representations of topological entities and containment histories of the topological entities, the containment histories listing sub-objects containing each topological entity absent an identification of operations performed therebetween, and further representing the object as a constructive solid geometry (CSG) tree defining boolean operations to be performed between the original BREPS, the method comprising the steps of:

a. identifying intersections between topological entities of said sub-objects, in each said boundary representation;

b. constructing a merged boundary representation from said boundary representations and said intersections identified by said step of identifying, thereby forming a plurality of new topological entities;

c. setting a containment history for each new topological entity to a union of the containment histories of the topological entities of the sub-objects from which each new topological entity was formed, the list formed absent an identification of operations performed between topological entities;

d. classifying said new topological entities of said merged boundary representation according to said containment histories;

e. selecting topological entities corresponding to said object, from among said classified merged boundary representation for display, said selecting performed in response to said classifying;

f. retaining all of said classified topological entities, without regard to said step of selecting; and g. displaying said selected topological entities corresponding to said object, from among said classified merged boundary representation.

6. The method of claim 5, further comprising the step of:

f. editing said merged boundary representation.

7. The method of claim 6 for displaying and editing objects including surfaces, faces, edges, vertices and regions belonging to said plurality of sub-objects, wherein step f. further comprises the steps of:

identifying a sub-object to be removed;

removing faces for which said classified new topological entities on each side of each said face differ only by said sub-object to be removed;

removing each said edge for which said edge is not adjacent to a face;

removing each said edge for which said edge is adjacent to two faces defining a single surface;

removing each said edge for which said edge is adjacent to exactly one face;

removing each said vertex for which said vertex is not adjacent to an edge and is not adjacent to a face;

removing each said vertex for which said vertex is not adjacent to an edge and is adjacent to a face;

removing each said vertex for which said vertex is adjacent to two edges on one surface and adjacent to two faces; and removing said sub-object from said classified new to topological entities remaining.

8. The method of claim 5, wherein step d. further comprises the steps:

d.1 receiving a selection criterion; and d.2 marking locations in the memory corresponding to topological entities whose classified containments fit said selection criterion.

9. The method of claim 8, further comprising the steps of:

d.3 receiving a new selection criterion;

d.4 deselecting portions of said classified merged boundary representation by unmarking locations in the memory corresponding to topological entities having classified containments fitting said selection criterion; and d.5 selecting portions of said classified merged boundary representation by marking locations in the memory corresponding to topological entities having classified containments fitting said new selection criterion.

10. A computer system for displaying representations of solid objects comprising:

a computer memory for storing a plurality of component geometric models, each component geometric model comprising one of more boundary elements;

a computer input means for specifying one or more combinatorial operations for combining at least two component geometric models to form a combined geometric model;

a computer processor running a software program to perform the specified operation on the component geometric models, thereby generating the combined geometric model, said processor executing steps in the software program to merge all component geometric models in the combined geometric model, intersect the combined geometric model to form merged boundaries where each merged boundary and all component geometric models containing the merged boundary intersect at an intersection equal to the merged boundary, form a containment history for each merged boundary listing identifiers of component geometric models containing each merged boundary by forming a union of containment histories of the component geometric models intersected to form each merged boundary, the list formed absent an identification of operations performed between topological entities, and identify one or more boundary elements of the combined geometric model as output boundary elements; and a computer readout and display means for reading from said computer memory and displaying said segment boundary elements identified as output boundary elements of the combined geometric model such that the displaying of the output boundary elements displays the representation of a solid object;

the computer memory further storing a. an identification of the boundary elements contained in each component model;

b. an identification of the containment history of all the boundary elements identified, the list formed absent an identification of operations performed between topological entities;

c. an identification of the boundary elements which are output boundary elements;

d. an identification of all component models contained in the combined geometric model; and e. separate from the identification of the containment history, an identification of all the combinatorial operations performed on the identified component models.

11. An information processing system for representing an object in a multi-dimensional coordinate space as a plurality of primitives and operations to be performed therebetween stored in a memory as a constructive solid geometry (CSG) tree and a plurality of original boundary representations (BREPs), the original BREPs including boundaries dividing the coordinate space into a plurality of regions, and the original BREPs further including containment histories of the plurality of regions, the containment history of each region listing identifiers of those primitives containing the region, the list formed absent an identification of operations performed between topological entities, the system comprising:

a processor unit executing a software program including instructions to:

a. merge the plurality of original BREPs into a merged BREP including all boundaries of the plurality of original BREPs and including all new boundaries created by intersections among objects represented by the plurality of original BREPs, thereby forming a new plurality of regions, b. add elements to the CSG tree representation of the primitives and operations performed therebetween to form the object, and c. classify each new region of the new plurality of regions as belonging to all regions of the plurality of regions which contain each new region by forming a union of containment histories of original BREPs containing each new region; and a memory for storing the original and merged BREPs, including the containment histories of the regions, and for separately storing the CSG tree.

12. A computer system for displaying representations of solid objects comprising:

a computer memory for storing a plurality of component geometric models, each component geometric model comprising one of more boundary elements;

a computer input means for specifying one or more combinatorial operations for combining at least two component geometric models to form a combined geometric model;

a computer processor running a software program to perform the specified operation on the component geometric models, thereby generating the combined geometric model, said processor executing steps in the software program to merge all component geometric models in the combined geometric model into a common database, intersect the combined geometric model to form merged boundaries defining merged regions, where each merged boundary and all component geometric models containing the merged boundary intersect at an intersection equal to the merged boundary, form a containment history for each merged region, the containment history being a portion of the common database holding a list of identifiers of component geometric models containing each merged region, the containment history formed as a union of containment histories of the component geometric models intersected to form each merged region and the containment history, the list formed absent an identification of operations performed between topological entities, and identify one or more boundary elements of the combined geometric model as output boundary elements; and a computer readout and display means for reading from said computer memory and displaying said segment boundary elements identified as output boundary elements of the combined geometric model such that the displaying of the output boundary elements displays the representation of a solid object;

the computer memory further containing a. a list of the boundary elements contained in each component model;

b. for each boundary element identified, a list identifying the containment history of the boundary element identified, the list formed absent an identification of operations performed between topological entities;

c. an identification with the boundary elements identified indicating which are output boundary elements; and d. separate from each list identifying the containment listing, an identification of all the combinatorial operations performed on the identified component models.

* * * * *